United States Patent

Stopler

(10) Patent No.: US 7,804,802 B2
(45) Date of Patent: Sep. 28, 2010

(54) ESTABLISHING PARAMETERS FOR TRANSMISSIONS IN WIRELESS COMMUNICATIONS NETWORK

(75) Inventor: Dan Stopler, Holon (IL)

(73) Assignee: Alvarion Ltd., Tel-Aviv (IL)

( * ) Notice: Subject to any disclaimer, the term of this patent is extended or adjusted under 35 U.S.C. 154(b) by 1263 days.

(21) Appl. No.: 11/353,009

(22) Filed: Feb. 14, 2006

(65) Prior Publication Data
US 2006/0182068 A1 Aug. 17, 2006

(30) Foreign Application Priority Data
Feb. 15, 2005 (IL) .................................... 166929

(51) Int. Cl.
*H04B 7/216* (2006.01)
(52) U.S. Cl. ...................... 370/335; 370/333; 455/409; 455/509; 375/260
(58) Field of Classification Search ................ 370/335; 375/260; 455/409
See application file for complete search history.

(56) References Cited

U.S. PATENT DOCUMENTS

| | | | |
|---|---|---|---|
| 5,978,414 A | 11/1999 | Nara | |
| 6,216,010 B1 | 4/2001 | Edwards et al. | |
| 6,385,462 B1 * | 5/2002 | Baum et al. | 455/522 |
| 6,625,776 B1 | 9/2003 | Wright et al. | |
| 6,683,916 B1 | 1/2004 | Sartori et al. | |
| 6,690,652 B1 | 2/2004 | Sadri | |
| 7,272,190 B2 * | 9/2007 | Blankenship et al. | 375/260 |

OTHER PUBLICATIONS

Blankenship et al. "Link Error Prediction Methods for Multicarriers Systems" pp. 1-5, 2004-Fall.*
Tee, A. et al., "Link-System Interface Simulation Methodologies", IEEE 802.20 Working Group on Mobile Broadband Wireless Access, (Jun. 29, 2004), 11 pp.

* cited by examiner

*Primary Examiner*—Patrick N Edouard
*Assistant Examiner*—Chuck Huynh
(74) *Attorney, Agent, or Firm*—Browdy and Neimark, PLLC

(57) ABSTRACT

In a wireless network comprising at least a first and a second wireless communication devices, a method is provided for determining at least one characteristic for communication between a base station and a subscriber terminal, based on information derived by affecting an exponential effective signal to interference ratio mapping (EESM) upon one or more signals transmitted by the base station and received by the subscriber terminal.

14 Claims, 4 Drawing Sheets

ESTABLISHING PARAMETERS FOR TRANSMISSIONS IN WIRELESS COMMUNICATIONS NETWORK

FIELD OF THE INVENTION

The present invention relates to transmitting and receiving signals in wireless communications systems, and more particularly to adapting rates and transmission power in radio communication systems.

BACKGROUND OF THE INVENTION

The use of adaptive power allocation with adaptive modulation/coding to allow flexibility in modifying power allocation has been of increasing interest both in the fixed wireless and cellular world.

In systems with power control capability, the power of a transmitted signal can be adjusted in order to meet a target signal quality, such as signal to interference ratio ("SIR") or signal to noise ratio ("SNR") or signal to interference plus noise ratio ("SINR"), at the receiver. In such a system, the transmit power will typically be low when a user is close to a base station and will increase with distance from the base station. However, with such applications, a compromise is made between coverage reliability and system capacity. If the system uses a robust form of modulation, such as Binary Phase Shift Keying (B-PSK), good coverage reliability can be obtained, but the system capacity and data rate may be lower than is desired. If, in an attempt to increase data rate and capacity, the system uses a more aggressive form of modulation, such as 8-PSK, the higher SINR requirement cannot be met for all of the users. As a result coverage reliability may be significantly reduced.

Accordingly, various methods were proposed in the past in the attempt to address the problem of implementing adaptive power allocation which achieve relatively high system capacity and system coverage, which provide adaptive modulation/coding capabilities and which provide flexibility to dynamically modify the adaptive power allocation.

U.S. Pat. No. 6,625,776 describes an adaptive coding scheme for controlling, independently, transmit power and coding levels for data transmitted in uplinks and downlinks by determining a data error rate associated with downlink data (e.g., a character error rate provided by a Reed Solomon decoder). This way, the level of coding (e.g., heavy or light) on data in the downlink to meet a desired data error rate, can be achieved.

U.S. Pat. No. 6,690,652 discloses an adaptive power control in wideband CDMA cellular systems (WCDMA) that is achieved by transmitting control signals between the BS and a mobile station to reconfigure their transmitter/receiver. Reconfiguration is performed according to the prediction of the channel attenuation and the threshold set at the BS or mobile station based on its channel power probability density function.

U.S. Pat. No. 6,216,010 describes an up-link power control for fixed wireless access communication networks. The distance information between an outstation and a base station and information relating to channel loss is employed by a power control algorithm whereby the signal power transmitted can be optimally controlled. This publication provides a power control strategy which adapts to the total channel loss as well as to the components of this loss.

U.S. Pat. No. 5,978,414 relates to a method for determining a transmission rate for encoded data frame, which relies on decoding signal at each candidate rate and using decoding reliability parameter or comparison with input, to identify one or more candidate transmission rates based upon the decoding reliability parameters. If there is only one candidate transmission rate, the actual transmission rate is determined to be that candidate transmission rate. If there is more than one candidate transmission rate, the decoded signals are re-encoded at the candidate transmission rates at which they were decoded. The bits of the communication are then compared with the bits of the re-encoded signals for each candidate transmission rate to determine the actual transmission rate.

U.S. Pat. No. 6,385,462 describes a method for providing criterion based adaptive power allocation with selective determination of modulation and coding. The method comprises providing adaptive power allocation with a target signal quality for each link based on a system criterion, and a modulation/coding rate for each link based on the signal quality associated with the transmit power of each link.

U.S. Pat. No. 6,683,916 discloses a method for adaptive modulation/coding and power allocation by reducing excess power for one data stream while retaining the same encoding rate, and increasing power level of another while increasing its encoding rate.

One of the methods known in the art for simulating link-system interface by estimating the demodulator performance in selective channel is the Exponential Effective SIR Mapping ("EESM"). The EESM estimates the effective SINR through the use of the following formula:

$$\gamma_{\textit{eff}} \equiv EESM(\gamma, \beta) \equiv -\beta \cdot \ln\left(\frac{1}{N} \cdot \sum_{i=1}^{N} e^{-\frac{\gamma_i}{\beta}}\right)$$

where:
  $\gamma$ is the a vector $[\gamma_1 \gamma_2, \ldots, \gamma_N]$ of the per OFDM tone SINRs, which are typically different in a selective channel;
  $\gamma_{\textit{eff}}$ is the effective SINR;
  $\gamma_i$ is the SINR of the i-th subcarrier, or segment in which channel response remains approximately constant;
  $\beta$ is the adjustment factor necessary for QPSK or higher-order modulation scheme; and
  N is the total number of subcarriers, or segments that have approximately constant channel response.

According to A. Tee et al., in "Link-System Interface Simulation Methodologies" published on Jun. 29, 2004, simulation data has indicated that the same factor $\beta$ may be used for different channel models with the same modulation and coding scheme.

Each of the references mentioned is hereby incorporated by reference as if fully set forth herein.

SUMMARY OF THE INVENTION

It is an object of the present invention to provide a method and apparatus to allow improving the quality of transmission in a wireless network.

It is another object of the present invention to provide a method and an apparatus to enable dynamic adaptation of power and/or modulation of the signals transmitted in wireless networks.

Other objects of the invention will become apparent as the description of the invention proceeds.

In accordance with a first aspect of the present invention, there is provided a method for use in a wireless network comprising at least a first and second wireless communication devices. The method allows determining at least one characteristic for affecting the communication to be held between the at least first and second devices, and wherein that at least one characteristic is derived by applying an exponential effective signal to interference ratio mapping (EESM) upon one or more signals transmitted by the first device and received by said second device. The method enables either determining that at least one characteristic prior to establishing the communication session itself, but in addition or in the alternative, will enable dynamic adaptation of transmissions while the communication session is being held.

Preferably, the characteristic is a member selected from the group consisting of: type of modulation, rate of transmission, transmission power, any combination thereof, and the like.

According to a preferred embodiment of the invention, the method comprises the following steps:

transmitting one or more signals from the first wireless communication device, towards a second wireless communication device;

at the second wireless communication device, receiving at least one of these one or more signals;

calculating the exponential effective SIR mapping (EESM) of the at least one of said one or more signals and determining the value of at least one pre-defined parameter associated with this EESM mapping;

communicating at least one of the values thus determined to the first wireless communication device;

based on that at least one of the values communicated, determining the at least one characteristic for holding communication between the first and second wireless devices; and transmitting a message from the first wireless communication device to the second wireless communication device indicating a mode of operation for carrying out communication between those first and second wireless communication devices.

Preferably, the method described above further comprises a step of determining the mode of operation based on the at least one characteristic thus determined and on further constrains associated with the operation of that first wireless communication device.

As will be appreciated by those skilled in the art, the method described herein should be understood to encompass method for use communicating in a point-to-point type of operation or for communicating between a base station and a subscriber e.g. fixed wireless networks or cellular networks.

By a preferred embodiment of the invention, the values communicated by the second wireless communication device comprise after communicating one or more thresholds, more preferably a table of thresholds, from the subscriber to the base station where each of these thresholds defines one or more minimum conditions required for operation according to a different code, the values of certain pre-defined parameter(s) associated with the EESM vis $\beta$ are transmitted periodically to the base station. Preferably, two types of parameters (e.g. reports) may be communicated to the first wireless communication device. The first type, that is particularly applicable for fast modulation/rate adaptation (H-ARQ), the current relationship of EESM as a function of $\beta$ is preferably communicated by the second wireless communication device, while the second type which is particularly applicable for slow modulation/rate adaptation (for high Doppler), EESM is computed by the second wireless device for several values of $\beta$ and for a number of frames. Thereafter, at least one pre-defined percentage, say 10% (or 1%, or any agreed upon number of values is selected, e.g. 50%, 10%, 1% and 0.1%) of the EESM graph tail for each of these $\beta$ values is communicated to the first wireless device.

Obviously, the different codes are ones that may be applied for the communication between those first and second wireless communication devices, i.e. that are supported by both devices.

Preferably, the values communicated comprise characteristics of one or more curves defining a relationship between the EESM value and the adjustment factor, $\beta$. Since from practical considerations we may assume linearity in the applicable range as demonstrated hereinafter, these characteristics could be two points at the EESM vis $\beta$ curve, one point and the value of the curve's slope, the value of the curve's slope and the offset, etc.

According to another aspect of the invention there is provided an access point (e.g. a base station) adapted to operate in a wireless network and comprising:

an interface operative to allow communication between the access point and at least one subscriber terminal associated with that wireless network;

at least one radio transceiver operative to transmit communication traffic towards the at least one subscriber terminal and receive wireless communication traffic therefrom;

at least one processor adapted to:

receive the value of at least one parameter associated with an EESM procedure affected by the at least one subscriber terminal onto signals received from this access point; and determine one or more conditions for carrying out communication between this access point and the at least one subscriber terminal, based on the value of the at least one parameter associated with the EESM procedure, thus received.

According to yet another aspect of the invention, there is provided a subscriber terminal adapted to operate in a wireless network and comprising:

an interface operative to allow communication between the subscriber terminal and at least one other wireless communication device;

at least one radio transceiver adapted to transmit communication traffic towards that at least one other wireless communication device and receive communication traffic therefrom;

at least one processor adapted to determine the value of at least one pre-defined parameter associated with an exponential effective SIR mapping (EESM) of signals received from the at least one other wireless communication device; and means to communicate at least one of the values determined, to the at least one other wireless communication device.

Upon notifying the two ends of the wireless link the one or more conditions for carrying out the communication, the devices located at these two ends of the link will preferably switch to communicate with each other in accordance with that one or more conditions.

DETAILED DESCRIPTION OF THE INVENTION

Figure 1A:
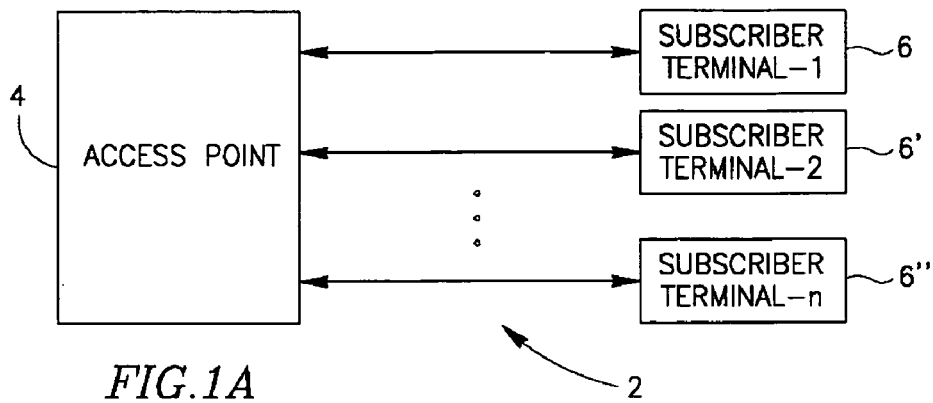
FIG. 1A—presents a schematic illustration of a radio network.

A better understanding of the present invention is obtained when the following non-limiting detailed description is considered in conjunction with the following drawings in which:

FIG. 1A describes a part of radio network constructed in accordance with an embodiment of the present invention. A schematic illustration of that part of the radio network 2 is provided in FIG. 1A which comprises an AP ("access point", e.g. a base station) 4 being in a wireless communication with a number of subscriber terminals, 6, 6' and 6".

Figure 1B:
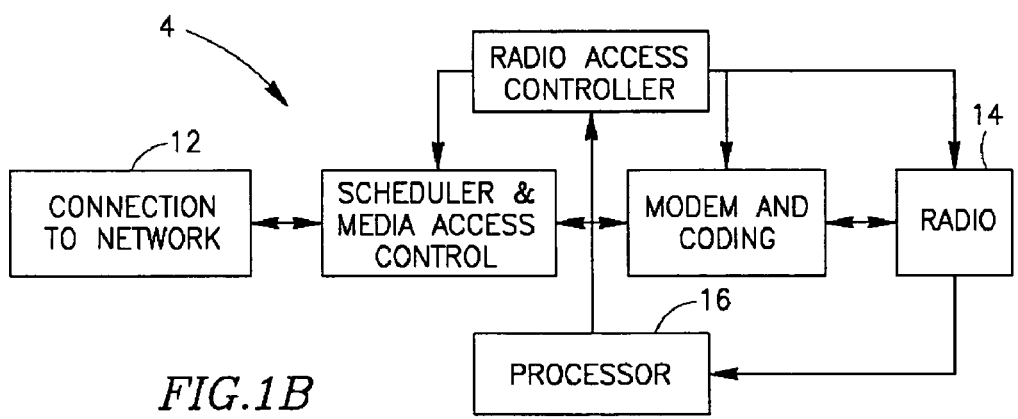
FIG. 1B—presents a schematic illustration of an Access Point in accordance with the present invention.
Figure 1C:
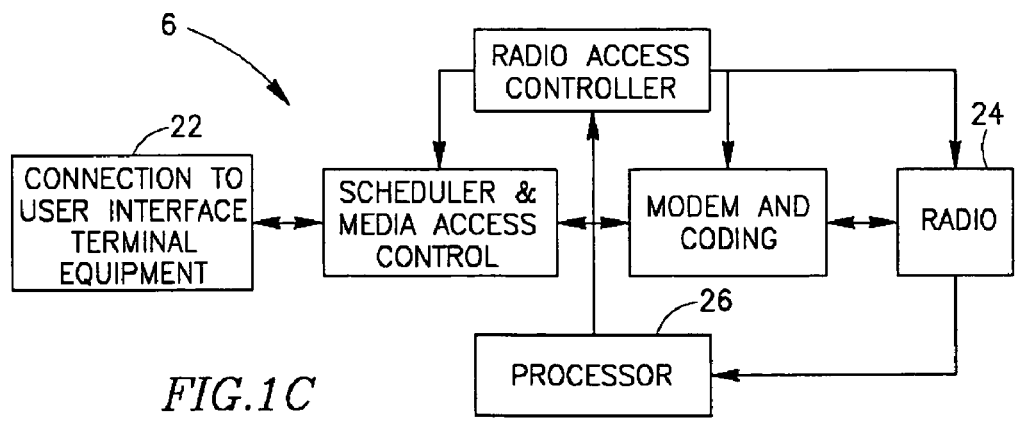
FIG. 1C—presents a schematic illustration of a subscriber terminal in accordance with the present invention.

FIG. 1B illustrates an exploded view of access point 4, which comprises in this present example, among others, an interface 12 operative to allow the connectivity of access point 4 to the feeding transmission network, and radio transceiver 14 which allows transmitting and receiving radio transmissions from each of the subscriber terminals connected to this access point. Access point 4 further comprises a processor 16 operative to receive at least one parameter associated with the EESM procedure effected by the subscriber terminal as will be further explained and determine one or more conditions, such as the code modulation scheme to be used, the rate of transmission and the power level of the transmission, for carrying out the communication between that access point and at least one subscriber terminal based on at least one EESM parameter received. Similarly, a subscriber terminal, (6 as shown in FIG. 1C) comprises an interface 22 operative to allow its connection to the user equipment and/or to the terminal equipment, a radio transceiver 24 which is operative to transmit and receive radio transmissions to and from access point 4, and processor 26 operative to determine, based on signal(s) received from the access point (e.g. the base station), at least one parameter associated with an exponential effective SIR mapping (EESM) of that signal(s), and to generate a message for forwarding to that access point that will comprise the value of at least one parameter associated with the at least one EESM parameters.

As was previously explained, in accordance with the present invention, the subscriber terminal, e.g. the Mobile Subscriber Station ("MSS") reports to the base station the value(s) of pre-defined parameter(s) associated with the EESM, e.g. the current value of the $\gamma_{\mathit{eff}}$, in order to allow the BS to determine appropriate modulation and coding to be used and/or if and what power boosting should be applied. The power boosting (power control) may be of help particularly for users experiencing difficult SINR conditions, e.g. users at edge of a cell.

Normally, when the EESM is used (for modeling purposes), for each modulation type and coding rate a different $\beta$ should be applied, and for each such $\beta$ a different power boosting may be considered. Contrary to a white channel case, 1 dB increase in the transmit power does not translate to a 1 dB increase in $\gamma_{\mathit{eff}}$. Moreover the increase of $\gamma_{\mathit{eff}}$ is $\beta$ dependent, as can be seen below (where B denotes the power boosting ratio)

$$EESM(\gamma \cdot B, \beta) \equiv -\beta \cdot \ln\left(\frac{1}{N} \cdot \sum_{i=1}^{N} e^{-\frac{\gamma_i \cdot B}{\beta}}\right) \neq EESM(\gamma, \beta) \cdot B$$

Consequently one would have to transmit a two dimensional matrix to adequately transfer the required data, which is practically undesirable in such wireless communications applications.

Thus, according to a preferred embodiment of the invention, the following formula is used:

$$EESM(B \cdot \gamma, \beta) \equiv -\beta \cdot \ln\left(\frac{1}{N} \cdot \sum_{i=1}^{N} e^{-\frac{\gamma_i \cdot B}{\beta}}\right) =$$

$$B \cdot \left(-\frac{\beta}{B}\right) \cdot \ln\left(\frac{1}{N} \cdot \sum_{i=1}^{N} e^{-\frac{\gamma_i}{\beta/B}}\right) = B \cdot EESM(\gamma, \beta/B)$$

Applying this formula enables the user to send limited information to represent the relationship between the EESM and $\beta$ for any given SINR vector, and this information suffices to derive both the recommended power boosting and rate adaptation therefrom.

Figure 2A:
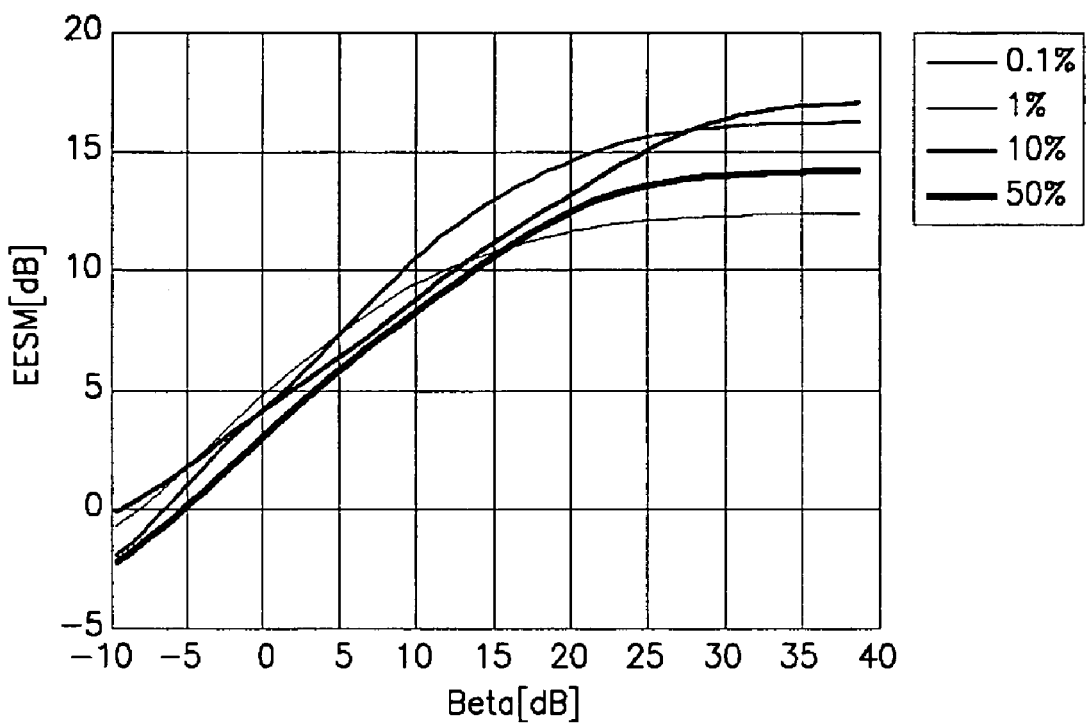
FIGS. 2A to 2D—illustrate graphs of EESM plotted as a function of $\beta$, for different cases.

FIGS. 2A to 2D present graphs of EESM as a function of $\beta$, for different cases. FIG. 2A demonstrates EESM graphs for 4 different $\gamma$ vectors, drawn from a 24 IID Rayleigh tones independent distributions, with average SINR being 10 dB for all tones. Both EESM and $\beta$ are provided in this Figures in dB. As may be seen from these graphs, the EESM-$\beta$ relationship may be approximated locally as being linear (in dB·$\cdot$dB scale), and have overall a linear shape with saturation at $\beta$>15 dB. From a practical point of view, this saturation occurs only with unlikely to be achieved $\beta$ values. Therefore, a linear approximation may be applied as a mean to reduce the required information that describes the EESM-$\beta$ relationship that will be transmitted from the subscriber terminal to the BS.

For the purpose of fast rate adaptation or hybrid ARQ, the subscriber terminal, e.g. a mobile unit ("MSS"), would need to provide instantaneous EESM to allow the BS to determine the rate and/or power boosting that will best match the MSS instantaneous EESM. This matching is done based on two tables, the minimum EESM table and the $\beta$ table. The former specifies for each pair of code and modulation the minimal required EESM thresholds. The latter table specifies for each code its $\beta$ value. A matching code and boosting pair must obey the following inequality $EESM\_Thresh_{Code} \leq EESM(\gamma \cdot B, \beta_{Code})$. However the number of rates that may be applicable is limited and also the corresponding $\beta$ values are close to each other. In addition, the power boosting range is also rather limited, so from a practical point of view we should consider a relatively narrow range out of the $\beta$ axis. Under these conditions, a local linear approximation was found to suffice, and the information related to the EESM-$\beta$ relationship may be compressed accordingly. Thus, in a typical case, the MSS initially (e.g. on handover to a new cell) sends two tables comprising EESM thresholds and $\beta$ values for each type of modulation, coding and rate, and then, at a sufficiently high periodicity, the MSS transmits a local linear approximation for the EESM as a function of $\beta$.

Figure 2B:
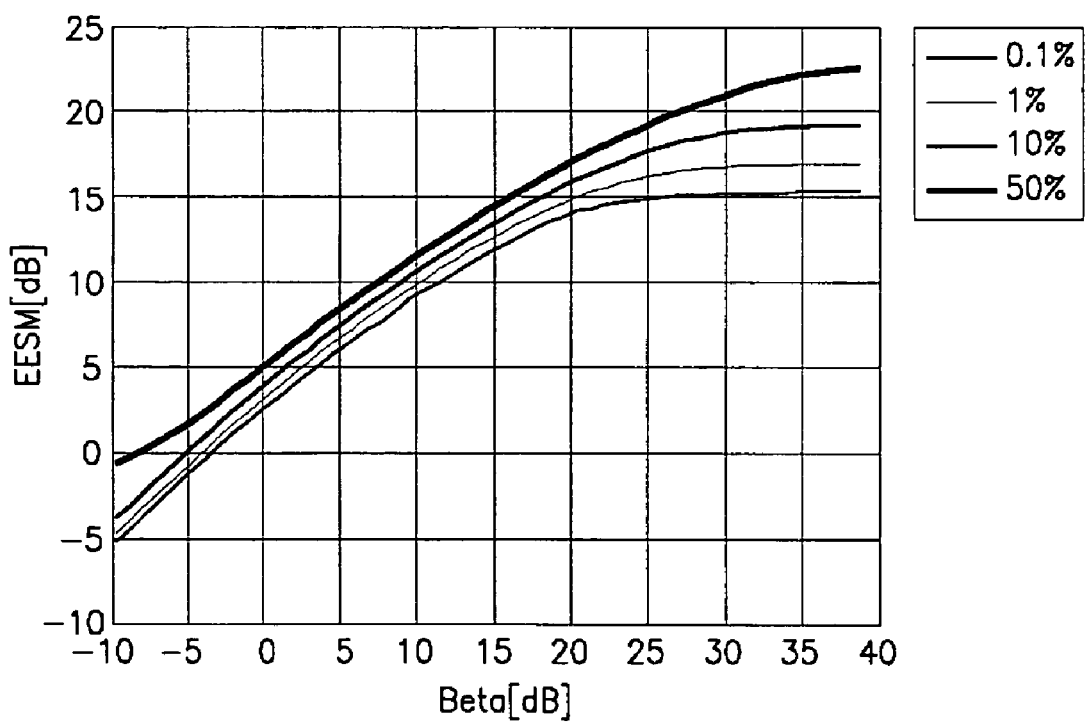
Figure 2C:
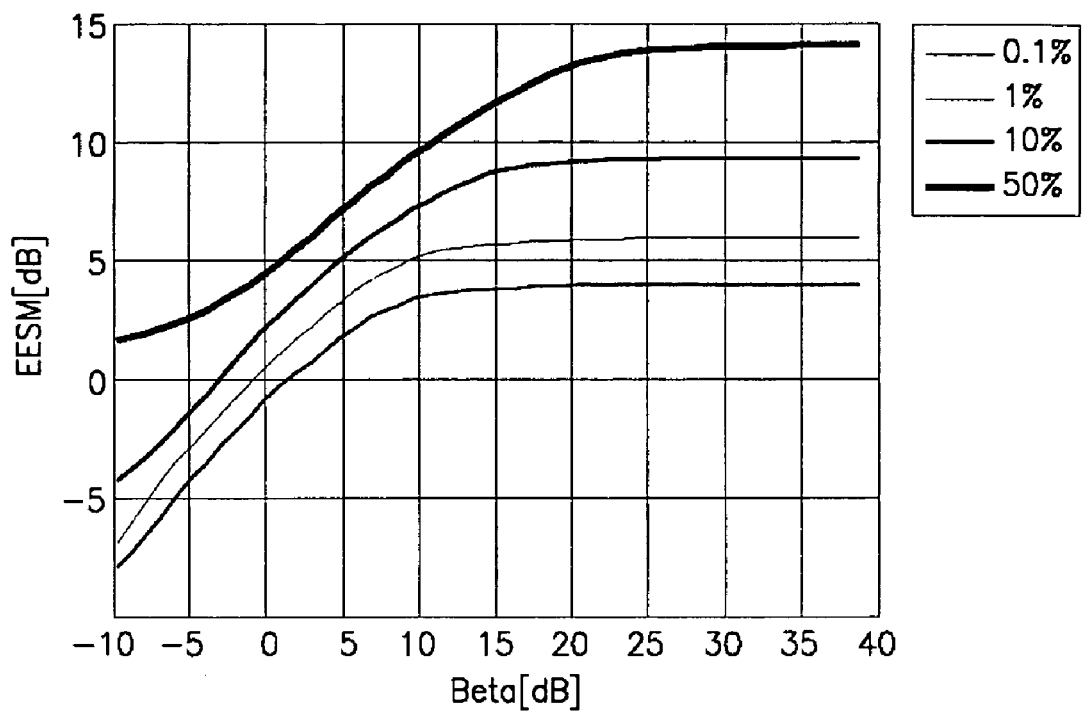
Figure 2D:
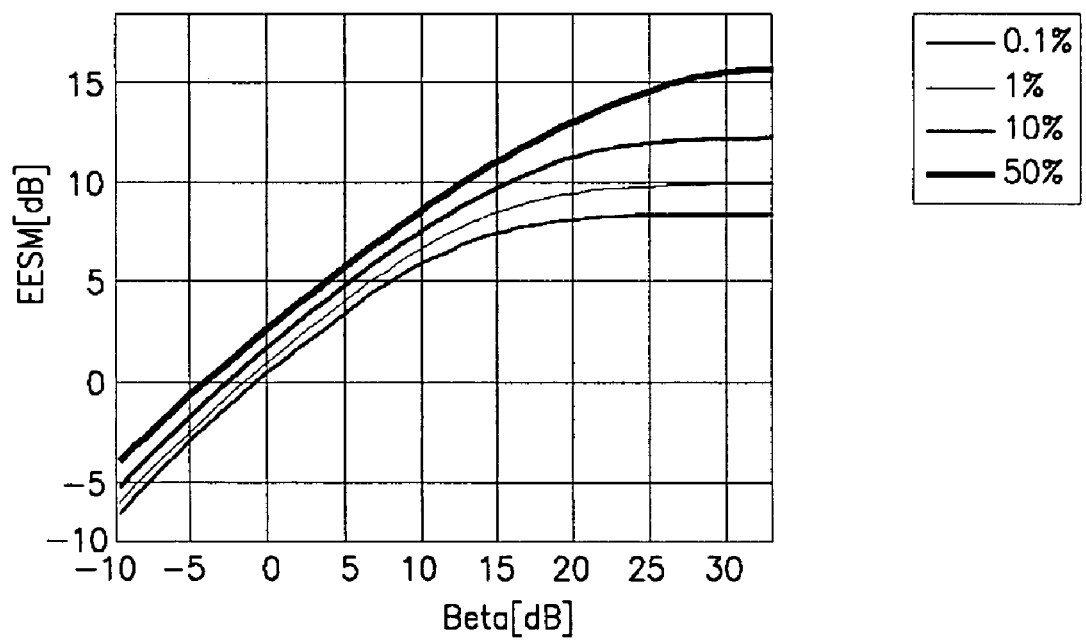

For high Doppler frequencies, very fast rate adaptation is not likely to be possible, since the rate adaptation will typically be too slow to cope with the changes in the channel, so that by the time the new rate is determined, the channel would have already changed. In these cases the rate/boosting should be selected to guarantee a low packet error rate ("PER") value (such as 10%, 1%, 0.1%) even if the channel does change. In these cases, the rate/boosting should be selected according to the low (EESM) tail of the cumulative distribution function of the EESM, where the CDF is computed over the ensemble of possible Rayleigh/rician fades for signal and interference. FIG. 2B to 2D illustrate curves of 50%, 10%, 1% and 0.1% "low tail EESM" as a function of $\beta$ for different SINR values. Again it may be seen that the graphs are being locally linear, and saturate at high beta values.

The boosting formula $EESM(B \cdot \gamma, \beta) = B \cdot EESM(\gamma, \beta/B)$ is still applicable, as it is for all individual cases. More precisely, if we use $\mathrm{rank}_{X\%}$ as the parameter that returns the X% percentile low tail of EESM distribution due to random vector $\gamma$, then:

$$\mathrm{rank}_{X\%}(EESM(B \cdot \gamma, \beta)) = \mathrm{rank}_{X\%}(B \cdot EESM(\gamma, \beta/B)) = B \cdot \mathrm{rank}_{X\%}(EESM(\gamma, \beta/B))$$

For the purpose of rate adaptation under high Doppler (or slow feedback), the MSS will have to compute the X percentile of the low tail of the EESM to $\beta$ curve. Again since relevant coding rates are few and $\beta$ differences are small, local linearity will suffice to represent the X percentile low tail EESM to $\beta$ curve.

Computing the X percentile low tail EESM to $\beta$ curve may be easier in cases where the per tone SNR is IID and the number of tones is high. In this case $$\frac{1}{N} \cdot \sum_{i=1}^{N} e^{-\frac{\gamma_i}{\beta}},$$

being an average of IID variables would have an approximate gaussian behavior. So the MSS may compute the mean and the variance in order to estimate the X percentile low tail EESM to $\beta$ curve, by using a gaussian approximation. Otherwise, the MSS would need to collect sufficient statistics to build EESM histogram per several (e.g. two) $\beta$ values, and transmit its X percentile low tail to the BS.

The $y_i$ values applied in the EESM formula $$\frac{1}{N} \cdot \sum_{i=1}^{N} e^{-\frac{\gamma_i}{\beta}}$$

indicate SINR per tone. Still, if the SINR value per tone is unavailable, it may be applied alternately as indicating SNR per tone, or Signal to average interference and noise (where interference is averaged over all tones).

The curve of EESM as a function of $\beta$ may be condensed by several ways. For example, by using an EESM value for some $\beta_0$ and the gradient (slope) of the EESM curve as a function of $\beta$ around $\beta_0$. Alternatively, it is possible to pass two or more (EESM,$\beta$) pairs, and assume linear interpolation between them. Various other types of compression using polynomials or splines that are known in the art per se, may alternatively be used.

By another embodiment, $\beta$ is condensed to the EESM curve by translating interesting operation points to a small range of $\beta$ values. Let us consider an example where we translate any $\beta$ value to the neighborhood of $\beta$ for QPSK rate $\frac{1}{2}$.

$\beta_{QPSK}$, $Th_{QPSK1/2}$ are respectively the $\beta$ value and the threshold EESM for QPSK rate $\frac{1}{2}$, while $\beta_{xQAMy}$, $Th_{xQAMy}$ are the $\beta$ value and the threshold EESM for x QAM rate y, respectively (e.g. for 64 QAM rate $\frac{3}{4}$, x=64 y=$\frac{3}{4}$). Now, let us assume for QPSK $\frac{1}{2}$ $$Th_{QPSK1/2} = EESM(\gamma, \beta_{QPSK})$$

and evaluate the boosting (B) required for xQAMy (e.g. 16 QAM rate $\frac{1}{2}$)

$$Th_{xQAMy} = EESM(\gamma \cdot B, \beta_{xQAMy})$$

Expressing the boost as $$B = \frac{Th_{xQAMy}}{Th_{QPSK1/2}} \cdot X$$

Upon dividing, one gets $$\frac{Th_{xQAMy}}{Th_{QPSK1/2}} EESM(\gamma, \beta_{QPSK}) = EESM\left(\gamma \cdot \frac{Th_{xQAMy}}{Th_{QPSK1/2}} \cdot X, \beta_{xQAMy}\right)$$

Using the boosting formula $EESM(B \cdot \gamma, \beta') = B \cdot EESM(\gamma, \beta'/B)$ and assigning $\beta' = \beta \cdot B$ we get the following alternative form:

$$B \cdot EESM(\gamma, \beta) = EESM(B \cdot \gamma, B \cdot \beta).$$

Upon applying this form, one gets $$EESM\left(\frac{\gamma}{Th_{QPSK1/2}}, \frac{\beta_{QPSK}}{Th_{QPSK1/2}}\right) = EESM\left(X \cdot \frac{\gamma}{Th_{QPSK1/2}}, \frac{\beta_{xQAMy}}{Th_{xQAMy}}\right)$$

Which can also be expressed as $$EESM\left(\frac{\gamma}{Th_{QPSK1/2}}, \frac{\beta_{QPSK}}{Th_{QPSK1/2}}\right) = X \cdot EESM\left(\frac{\gamma}{Th_{QPSK1/2}}, \frac{\beta_{xQAMy}}{Th_{xQAMy} \cdot X}\right)$$

However it so happens that for typical channel codes (e.g. WiMax convolutional turbo code) for the same rate y=$\frac{1}{2}$ and for various constellation sizes x, it was found that $$\frac{\beta_{QPSK}}{Th_{QPSK1/2}} \approx \frac{\beta_{xQAMy}}{Th_{xQAMy}},$$

therefore X~1.

Furthermore, even for different y's=$\frac{1}{2}$, $\frac{2}{3}$, $\frac{3}{4}$ the following is true $$1 < \frac{\beta_{QPSK}/Th_{QPSK1/2}}{\beta_{xQAMy}/Th_{xQAMy}} < 2$$

Therefore it is clear that there is a limited X range that is of interest. Typically, that range of interest is about 3 dB. For such a case, only a 3 dB wide range of $\beta$ values should be estimated and conveyed from the CPE to the base station. This may be considered as providing a further assurance that the linear approximation suggested for the $\beta$ vis EESM curve, is indeed a useful approximation.

According to another embodiment of the present invention, different parameters of the curve may be transmitted at different rates: e.g. EESM value for some $\beta_0$ may be transmitted at high rate, while the gradient of EESM as a function of $\beta$ around $\beta_0$ may be transmitted at low rate (or alternatively may be considered to be constant).

By yet another embodiment of the invention, when applying the boost formula EESM(B·γ,β)=B·EESM(γ,β/B), instead of parameterizing the EESM curve as a function of β, we may parameterize the EESM as a function of the boost B while keeping β constant at some pre-determined value.

Figure 3:
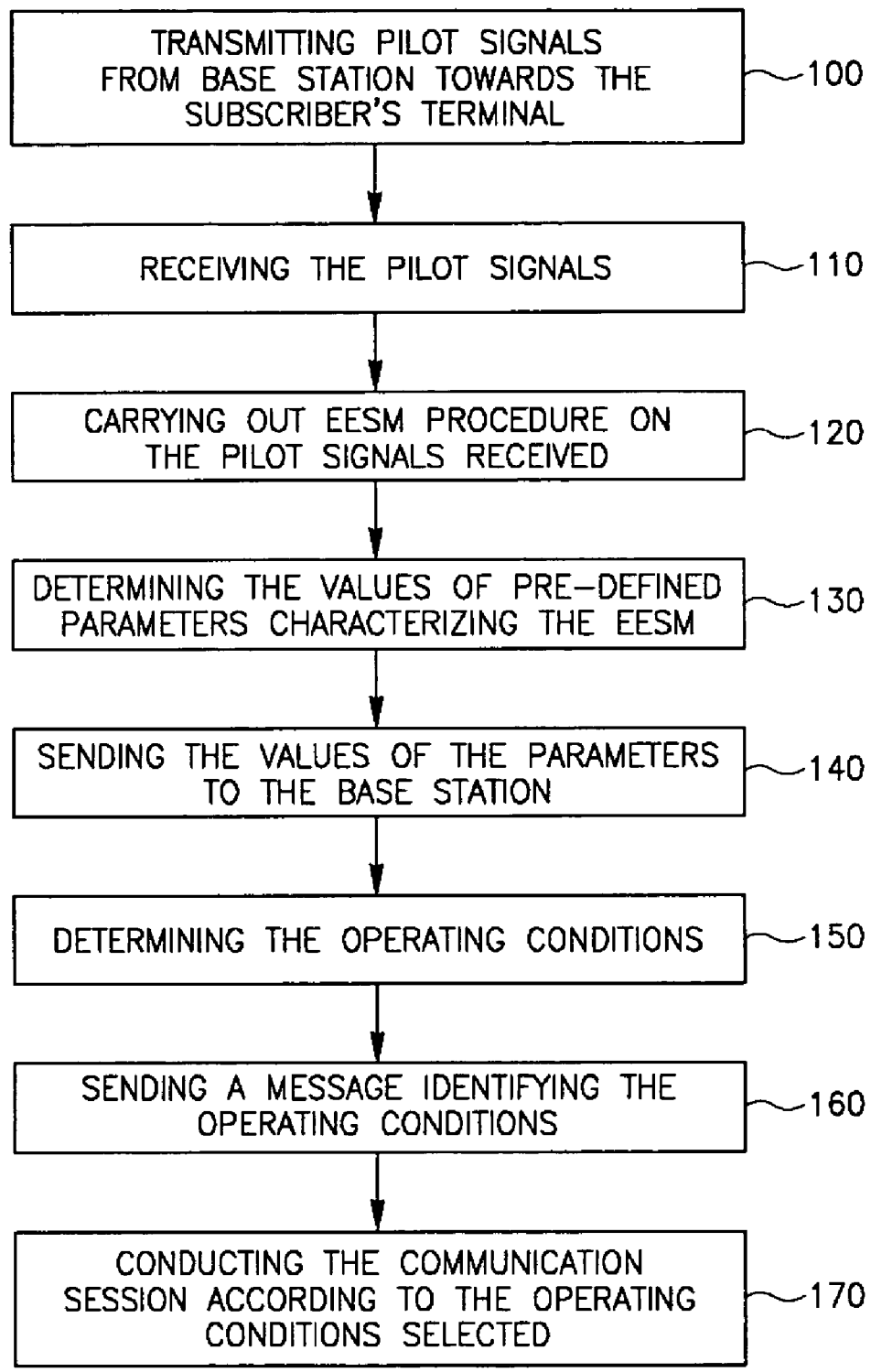
FIG. 3—demonstrates an example of a method for carrying out the present invention.

FIG. 3 illustrates a method of carrying out the adaptation in the transmission between a base station and a subscriber terminal, according to an embodiment of the present invention.

First, the base station transmits one or more pilot signals towards the subscriber's terminal (step 100). Such pilot signal(s) may be either pre-defined signal(s) or random signal(s), and also may either comprise a single signal or a sequence of signals.

Next, the pilot signal is received at the subscriber's terminal (step 110). Thereafter, the EESM of the pilot signal is carried at the subscriber's terminal (step 120) and at least one parameter associated with that exponential effective SIR mapping (EESM) of the received pilot signal(s) is determined (step 130), so as to enable the base station that will receive this at least one parameter to generate one or more curves of EESM as a function of β (or relevant parts of such curves), and reporting the value(s) of that one or more parameters to the base station (step 140).

The base station in return, determines the conditions e.g. the modulation type and/or the coding rate and/or power boosting etc., for carrying out the communication with the subscriber's terminal, based on the value(s) of the parameter(s) received (step 150). However, as will be appreciated by those skilled in the art, receiving the values of these pre-defined parameters does not necessarily lead to a certain set of operating conditions, as the base station may also take into account some other factors that might have an adverse effect upon the conditions finally selected, such as the available power at the base station to affect the boosting, interferences that may be caused to other channels or to co-channels in adjacent networks, etc. Thereafter, the base station transmits to the subscriber's terminal a message indicating the selected condition(s) (step 160), and both ends of the link, the base station and the subscriber's terminal, start communicating in accordance with the conditions selected (step 170).

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention.

The invention claimed is:

1. In a wireless network comprising at least a first and a second wireless communication devices, a method for determining at least one characteristic for communication between said at least first and second devices based on information derived by affecting an exponential effective signal to interference ratio mapping (EESM) upon one or more signals transmitted by said first wireless communication device and received by said second wireless communication device, comprising:

transmitting one or more signals from said first wireless communication device, towards said second wireless communication device;

at said second wireless communication device, receiving at least one of said one or more signals;

calculating, at said second wireless communication device, said EESM of said at least one of said one or more signals and determining the value of at least one pre-defined parameter associated with said EESM;

communicating at least one of said values thus determined to said first wireless communication device;

based on said at least one of the values communicated, determining the at least one characteristic for holding communication between said first and second wireless communication devices;

transmitting a message from said first wireless communication device to said second wireless communication device indicating a mode of operation for carrying out communication between said first and second wireless communication devices;

wherein the communication of said values to the first wireless communication device is preceded by communicating to said first wireless communication device one or more thresholds, each of said one or more thresholds defining one or more minimum conditions required for operation according to a different code that may be applied for the communication between said first and second wireless communication devices; and wherein the values communicated comprise characteristics of one or more curves defining a relationship between the EESM value and a adjustment factor, β.

2. A method according to claim 1, wherein said characteristic is a member selected from the group consisting of: type of modulation, rate of transmission, transmission power, and any combination thereof.

3. A method according to claim 1, further comprising a step of determining said mode of operation based on said at least one characteristic thus determined and further constrains associated with the operation of said first wireless communication device.

4. A method according to claim 1, wherein said first wireless communication device is a base station and wherein said second wireless communication device is a subscriber terminal.

5. A method according to claim 1, wherein said relationship is assumed to be a linear relationship.

6. A method according to claim 5, wherein in the case of carrying out fast modulation/rate adaptation in conjunction with Hybrid-ARQ, the values communicated are of the current relationship of EESM as a function of β.

7. A method according to claim 5, wherein in the case of carrying out slow modulation/rate adaptation, EESM is computed by said second wireless device for several values of β and for a number of frames, and the values of at least one pre-defined percentage of the tail of the EESM graph is communicated for each β to said first wireless device.

8. A method according to claim 1, wherein the values communicated further comprising values of signal to interference and noise ratios (SINR).

9. A method according to claim 8, wherein different characteristics of one or more curves defining a relationship between the EESM value and values of SINR and β are communicated at different periodic rates.

10. An access point adapted to operate in a wireless network and comprising:

an interface operative to allow communication between said access point and at least one subscriber terminal associated with said wireless network;

at least one radio transceiver operative to transmit communication traffic towards said at least one subscriber terminal and receive wireless communication traffic therefrom;

at least one processor adapted to:
receive the value of at least one parameter associated with an EESM procedure carried out by said at least one subscriber terminal eat4~using signals received from said access point; and
determine one or more conditions for carrying out communication between said access point and said at least one subscriber terminal based on the value received of said at least one parameter associated with the EESM procedure; and
wherein said value of at least one parameter associated with an EESM procedure comprise characteristics of one or more curves defining a relationship between the EESM value and the adjustment factor, β.

11. An access point according to claim 10, wherein said relationship is assumed to be a linear relationship.

12. A subscriber terminal adapted to operate in a wireless network and comprising:
an interface operative to allow communication between said subscriber terminal and at least one other wireless communication device;
at least one radio transceiver adapted to transmit communication traffic towards said at least one other wireless communication device and receive communication traffic therefrom;
at least one processor adapted to perform an exponential effective SIR mapping (EESM) of signals received from said at least one other wireless communication device, and to determine the value of at least one pre-defined parameter associated with said EESM; and
means to communicate at least one of the values determined to the at least one other wireless communication device; and
wherein said value of at least one parameter associated with an EESM procedure comprise characteristics of one or more curves defining a relationship between the EESM value and the adjustment factor, β.

13. A subscriber terminal according to claim 12, wherein said relationship is assumed to be a linear relationship.

14. In a wireless network comprising at least a first and a second wireless communication devices, a method for determining at least one characteristic for communication between said at least first and second devices based on information derived by affecting an exponential effective signal to interference ratio mapping (EESM) upon one or more signals transmitted by said wireless communication device and received by said second wireless communication device, wherein said second communication device is adapted to apply the following formula:

$$EESM\ (B \cdot \gamma, \beta) \equiv -\beta \cdot \ln\left(\frac{1}{N} \cdot \sum_{i=1}^{N} e^{-\frac{\gamma_i \cdot B}{\beta}}\right) =$$

$$B \cdot \left(-\frac{\beta}{B}\right) \cdot \ln\left(\frac{1}{N} \cdot \sum_{i=1}^{N} e^{-\frac{\gamma_i}{\beta/B}}\right) = B \cdot EESM\ (\gamma, \beta/B)$$

where
B is the power boosting ratio;
γ is the a vector $[\gamma_1, \gamma_2, \ldots, \gamma_n]$ of the per Orthogonal frequency-devision multiplexing (OFDM) tone interference plus noise ratio (SINRs);
β is the adjustment factor necessary for Quadrature Phase Shift Keying (QPSK) or higher-order modulation scheme; and
N is the total number of subcarriers, or segments that have approximately constant channel response,
in order to enable said second communication device to send limited information to said first communication device representing a relationship between the EESM and β for any given SINR vector, thereby enabling to obtain recommended power boosting and rate adaption.

* * * * *